Sept. 4, 1934.  A. M. NIVEN  1,972,273
INTERNAL COMBUSTION ENGINE
Filed Nov. 26, 1929  2 Sheets-Sheet 1
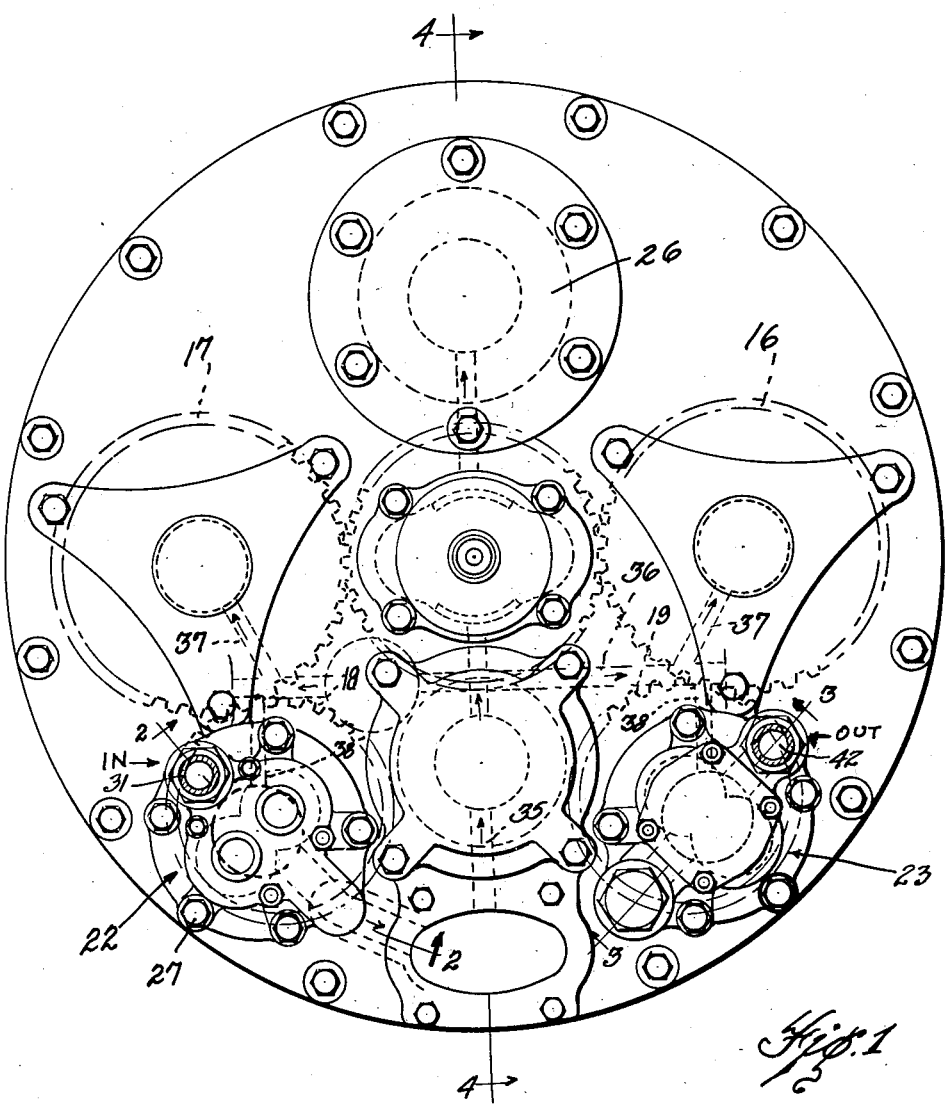
Fig. 1
INVENTOR.
ARCHIE M. NIVEN
BY 
ATTORNEY.

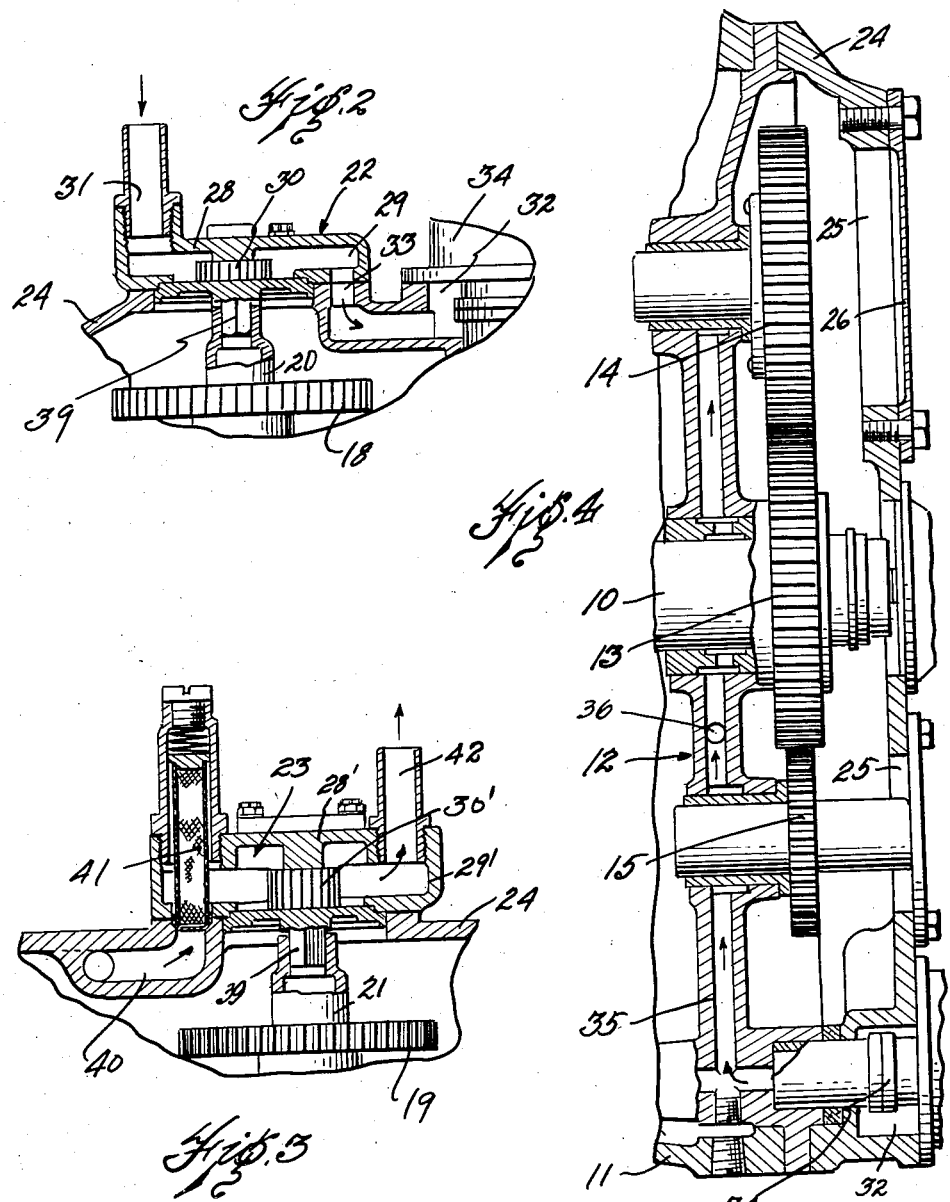

Patented Sept. 4, 1934

1,972,273

UNITED STATES PATENT OFFICE 1,972,273

INTERNAL COMBUSTION ENGINE

Archie M. Niven, Detroit, Mich., assignor, by mesne assignments, to Continental Aircraft Engine Company, a corporation of Delaware Application November 26, 1929, Serial No. 409,973

13 Claims. (Cl. 184—6)

My invention relates to internal combustion engines and more particularly to lubricating means associated with engines of the radial type adapted for use with aircraft, but I do not wish to limit my invention exclusively to such use as the principle of my invention may be embodied in engines other than the radial type and in engines other than aircraft engines.

It is the object of my invention to facilitate the manufacture of radial internal combustion engines by providing an improved means for assembling the oil pump therewith and for operatively connecting the said oil pump with the engine crankshaft.

Another object of my invention is to facilitate engine performance by providing an improved means for conveying and distributing lubricant under pressure to the parts to be lubricated, thereby insuring a positive supply of lubricant at all times to all parts of the engine, a requirement that is of utmost importance in the construction of aircraft engines where positive lubrication of all bearings is absolutely essential.

A further object of my invention is to construct an aircraft engine of economical manufacture and improved performance by providing a lubricating system therefor including a pump which may be quickly and readily assembled, and to which ready access may be had to facilitate the maintenance thereof.

A still further object of my invention is to construct an aircraft engine of the radial type of maximum efficiency by providing internal conduits in the gear case cover that communicate with other passages which more efficiently convey the lubricant to various parts of the engine to be lubricated, thereby eliminating all piping and separate conduits that are more readily broken or put out of commission.

For a more detailed understanding of my invention, reference may be had to the accompanying drawings, that illustrate one form which my invention may assume, and in which:

Figure 1 is a rear elevational view of a radial internal combustion engine constructed in accordance with my invention;

Figure 2 is a sectional detail of the oil pump and associated engine structure taken on the line 2—2 of Figure 1;

Figure 3 is a sectional detail view of the scavenging pump and associated engine structure taken on the line 3—3 of Figure 1; and Figure 4 is a vertical longitudinal sectional view of the rear portion of the engine, and illustrating in more detail, the lubricant distributing means taken on the line 4—4 of Figure 1.

The drawings illustrate an internal combustion engine of the radial type, which is especially adapted for use with aircraft and illustrate a portion of the rear end of the engine which includes a crankshaft 10 preferably supported in part by the crankcase 11 and by the partition wall 12 secured to the crankcase and located adjacent the rear open end thereof. This partition wall 12 preferably extends transversely in a plane at right angles to the crankshaft axis, and may be so constructed as to permit the assembly therewith of an accessory driving mechanism as described and claimed in my co-pending application, Serial Number 405,477 filed November 7, 1929. The structure herein described and claimed pertains to the lubricating means associated with such an engine and is particularly related to the construction and arrangement of parts that permits the assembly of the oil pump at the rear of the engine. My improved oil pump assembly removes the pumps from the air stream, and thereby provides an engine that may be more efficiently operated.

The various accessories carried by the internal combustion engine are driven through a single driving member 13, that is commonly referred to as the crankshaft starter gear, this gear being keyed to or otherwise operatively connected with the crankshaft 10. The starter gear 14 and the generator gear 15 are engaged by the crankshaft starter gear 13 and directly driven thereby. Located in substantially the same plane as the crankshaft starter gear and directly engaged therewith are the magneto driveshaft gears 16 and 17 respectively, these gears engaging the pump shaft gears 18 and 19 that are keyed or otherwise secured to the shafts 20 and 21 respectively, which are adapted to be respectively connected to the pressure pump 22 and the scavenging pump 23. These various gears are housed within the gear case cover 24 that is secured to the crankcase by bolts or other suitable fastening devices, this gear case cover being provided with openings 25 that are closed by the covers 26. A starter and a generator may be assembled with the engine by removing the cover 26 and connecting the same with an accessory drive within the gear case cover. Since these accessories are not always furnished by the engine manufacturer, the same are not illustrated as they form no part of the present invention, and they may be secured to their respective driving mechanism in the usual manner.

An oil pump 22 is attached to the rear face of the gear case cover by means of a plurality of bolts 27, and comprises a casing 28 provided with an internal chamber 29 in which a pair of pump gears 30 are rotatably supported. These pump gears are adapted to withdraw a lubricating oil from any suitable source of lubricant supply through the intake openings 31 and to inject the same into a well 32 within the gear case cover through the outlet ports 33. A filter 34 of any suitable construction is assembled to the gear case cover and projects within the well 32, the lubricating oil in said well being arranged to pass through the filter and thence into the main vertical oil conduit 35 that is drilled or otherwise formed within the wall 12, and which will conduct the lubricating oil to the bearings which support the generator drive shaft, the engine crankshaft and the starter drive shaft. A main horizontal oil passage 36 is constructed in the wall 12 and is arranged to lie at an angle with respect to the passage 35 and to intersect the same. Relatively short oil passages 37 connect with the main oil passage 36 near their outer ends for conducting lubricating oil to the bearings which support the magneto drive shafts. In addition, passages 38 communicating with the main passage 36 are formed within the wall for conducting lubricating oil to the bearings which support the pump shafts. It is of course understood that any number of lateral passages communicating with the main oil passages may be constructed for conducting oil to any part to be lubricated. I have provided a partition wall for the engine so constructed as to permit two or more intersecting main straight oil passages to be drilled or otherwise formed in the wall structure for conducting lubricant adjacent to parts that are to be lubricated. The intersecting main oil passages may be readily constructed and can be so arranged as to convey lubricant to the parts to be lubricated, whereby relative short lateral passages can be bored out or otherwise formed in the wall for connecting the main passages with the parts to be lubricated. It will be noted that I have provided a relative thin wall structure that is suitably webbed or otherwise reinforced for strength, which carries all the oil passages for lubricating the bearings carried by the wall structure, and preferably these oil passages are positioned substantially within the same plane, the plane of said communicating oil passages being parallel with the plane of the wall and also parallel with the plane of the driving gear mechanism housed within the gear case cover 25.

The pump shafts 20 and 21 have an axis that is parallel with respect to the crankshaft axis. The pump structure is of a standard construction and the pump shafts 20 and 21 are adapted to be detachably connected to the squared studs 39.

The scavenging pump 23 is constructed similar to the pressure pump 22 and comprises a casing 28' having a chamber 29' in which the pump gears 30' are located and which withdraw oil from the crankcase of the engine through a passage 40, that is cored or otherwise formed within the gear case cover. The lubricating oil before being passed into the scavenging pump 23 is forced to pass through a filter unit 41. The scavenging pump is provided with an outlet port 42 that may be connected in any suitable manner with the source of lubricant supply. It may be here noted that the pump gears 30 and 30' of the oil pump and scavenging pump respectively are rotatable about an axis parallel with the crank shaft axis and such gears may be more readily referred to as lubricant propulsion means, since other types of oil pumps may be assembled with an engine of this character if desired.

It may be here noted that my construction eliminates the use of all separate and detachable tubing which has been most commonly used in engines of this character for conducting oil from the pump to the bearings and from the crankcase to the source of lubricant supply. Such piping has the tendency to get out of order or break, and thus by providing intermediate connecting passages for the lubricating oil in the crankcase cover, engine failure due to broken oil lines or connections is reduced to a minimum. The provision of two separate drive shafts for supporting the oil pump and the scavenging pump facilitates the assembly of the pump units with an engine of this character, and such assembly is facilitated because of the fact that the drive for these pumps have an axis parallel to the crankshaft axis. This construction permits the mounting of the pumps on the rear of the crankcase cover, on separate shafts, and the said pumps are thus positioned in such a location as to not interfere with the air stream and consequently the engine may be more efficiently operated.

It is further noted that the pumps are so arranged as to provide an outlet and inlet for the pressure and scavenging pumps which are located at or near the bottom of the crankcase. An advantage of this construction is that either or both of the pumps could be replaced or repaired with a minimum of time and effort as the same are attached to separate driving means and can be individually serviced. Therefore, I have provided a structure which may be economically and efficiently assembled with a radial internal combustion engine and which is constructed to facilitate the maintenance of efficient lubrication of the engine.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine, the combination of a crankcase having oil passages, a crankshaft, a gear case located at the rear of the crankcase and including a gear case cover having an oil conduit communicating with said oil passages and terminating in the rear face thereof, an oil pump secured to the rear face of said gear case cover and provided with an oil discharge opening in direct communication with the oil conduit in said gear case cover, and means for actuating the pump.

2. In an internal combustion engine, the combination of a crankcase having oil passages, a crankshaft, a gear case located at the rear of the crankcase and including a gear case cover having a cored oil conduit, one end of which terminates in the rear face of the cover and the other end directly communicating with said oil passages, an oil pump secured to the rear face of said gear case cover and located externally of the gear case, said pump provided with an oil discharge opening in communication with the oil conduit in said gear case cover, and means for actuating the pump.

3. In an internal combustion engine, the combination of a crankcase having oil passages, a crankshaft, a gear case located at the rear of the crankcase and including a gear case cover having an oil well and an internal conduit communicating with said passages and said well, an oil pump secured to the rear face of said gear case cover and located externally of the gear case, said pump provided with an oil discharge communicating with the oil well in the gear case cover, means for operating the pump for inducing circulation of the oil from said well to the parts to be lubricated.

4. In an internal combustion engine, the combination of a crankcase, a crankshaft, a wall located at the rear of the crankcase, accessory drive mechanisms operatively connected with said crankshaft and nested thereabout, bearing means carried by said wall for supporting said mechanisms, said wall provided with two or more intersecting oil passages for conducting oil to said bearing means, and means for connecting said passages to a source of lubricant supply.

5. In an internal combustion engine, the combination of a crankcase, a crankshaft, a wall located at the rear of said crankcase, a plurality of accessory drive mechanisms operatively connected with said crankshaft and nested thereabout, bearing means carried by said wall for supporting said mechanisms and located in substantially a common plane extending transversely to said crankshaft, said wall provided with two or more internal intersecting oil passages for conducting oil to said bearing means and extending substantially in the same plane in which said bearing means are located, and means for connecting said passages to a source of lubricant supply.

6. In an internal combustion engine, the combination of a crankcase, a crankshaft, a wall located at the rear of said crankcase, a plurality of accessory drive mechanisms operatively connected with said crankshaft and nested thereabout, bearing means carried by said wall for supporting said mechanisms and located in substantially a common plane extending transversely to said crankshaft, said wall provided with two or more main intersecting oil passages for conducting oil to said bearing means and extending substantially in the same plane for distributing oil to points closely adjacent to said bearings, said wall also provided with lateral passages extending in substantially the same plane as said main oil passages for connecting the bearings with said main oil passages, and means for connecting said passages to a source of lubricant supply.

7. In an internal combustion engine of the radial type, the combination of a crankcase, a crankshaft, a wall located at the rear of said crankcase, a plurality of accessory drive mechanisms operatively connected with said crankshaft and nested thereabout, bearing means carried by said wall for supporting said mechanisms located in substantially a common plane extending transversely to said crankshaft, said wall provided with two or more straight intersecting main oil passages extending in the plane of the wall and with one or more lateral passages for connecting some of said bearings to said main oil passages, and means for connecting said passages to a source of lubricant supply.

8. In an internal combustion engine, the combination of a crankcase, a crankshaft, a wall located at the rear of said crankcase, a plurality of accessory drive mechanisms operatively connected with said crankshaft and nested thereabout, bearing means carried by said wall for supporting said mechanisms and located in substantially a common plane extending transversely to said crankshaft, said wall provided with a plurality of straight intersecting main oil passages extending in the plane of the wall and in the plane of the bearings carried by said wall and with relatively short lateral passages located in the same plane as said main oil passages for connecting some of said bearings to the main oil passages, and means for connecting said passages to a source of lubricant supply.

9. In an internal combustion engine having a crankshaft and a plurality of cylinders disposed radially about the crankshaft and including a crankcase and associated gear case having communicating internal oil conducting passages, the combination therewith of an oil pressure pump and an oil scavenging pump each supported at the rear of said gear case and each including oil propulsion means arranged for rotation about an axis parallel to the axis of the crankshaft, said oil pressure pump and oil scavenging pump respectively having an outlet and inlet communicating directly with the oil conducting passages of said gear case, and driving means for operatively connecting the oil propulsion means of said pumps with said crankshaft and including intermediate driving means to which said oil propulsion means is removably connected.

10. In an internal combustion engine, a crankcase and associated gear case having communicating oil conducting passages, a crankshaft and an associated crankshaft driving gear, a gear case cover removably secured to said gear case and having oil passages extending therethrough in communication with said crankcase and gear case passage, an oil pump supported by said gear case cover externally thereof and having an outlet arranged for direct communication with said oil conducting passages of said gear case cover, and driving means for operatively connecting said pump with said crankshaft and including driving means extending through said cover and removably engaged with the crankcase driving gear.

11. In an engine of the radial cylinder type, a crankshaft having a crankshaft driving gear, a crankcase and associated gear case having oil conducting passages, a gear case cover removably secured to said gear case, an oil pressure pump and an oil scavenging pump each supported on the rear face of said cover and externally of the gear case, said cover having oil conducting passages communicating with said first mentioned passages, said oil pressure pump and said scavenging pump each respectively provided with oil outlet means and oil inlet means communicating directly with the oil conducting passages in said cover, and means for driving said pumps including a driving shaft for each pump extending through said cover and adapted for removable connection with said crankshaft driving gear.

12. In an engine of the radial cylinder type, a crankshaft, a crankcase and associated gear case having oil conducting passages, a gear case cover removably secured to said gear case, an oil pressure pump and an oil scavenging pump each supported on the rear face of said cover and externally of the gear case, said cover having oil conducting passages communicating with said first mentioned passages, said oil pressure pump and said scavenging pump each respectively provided with oil outlet means and oil inlet means communicating directly with the oil conducting passages in said cover, gearing within said gear case driven by said crankshaft for driving said pumps, and a driving shaft for each pump extending through said cover and removably connected with said gearing.

13. In an internal combustion engine having a crankshaft and a plurality of cylinders disposed radially about the crankshaft and including a crankcase and associated gear case having communicating internal oil conducting passages, the combination therewith of an oil pressure pump and an oil scavenging pump each supported at the rear of said gear case and spaced laterally from the crankshaft and from each other and each including oil propulsion means arranged for rotation about an axis parallel to the axis of the crankshaft, said oil pressure pump and oil scavenging pump respectively having an outlet and inlet communicating directly with the oil conducting passages of said gear case, and separate driving means for operatively connecting the oil propulsion means of each pump with said crankshaft and including intermediate driving means to which said oil propulsion means is removably connected.

ARCHIE M. NIVEN.